(12) United States Patent
Maes (10) Patent No.: US 10,488,649 B2
(45) Date of Patent: Nov. 26, 2019

(54) POLARIZED WAVELENGTH CONVERSION WHEEL (71) Applicant: BARCO NV, Kortrijk (BE)

(72) Inventor: Dirk Maes, Bissegem (BE)

(73) Assignee: BARCO NV, Kortrijk (BE)

( * ) Notice: Subject to any disclaimer, the term of this patent is extended or adjusted under 35 U.S.C. 154(b) by 0 days.

(21) Appl. No.: 15/570,936

(22) PCT Filed: May 21, 2015

(86) PCT No.: PCT/EP2015/061214
§ 371 (c)(1),
(2) Date: Oct. 31, 2017

(87) PCT Pub. No.: WO2016/184522
PCT Pub. Date: Nov. 24, 2016

(65) Prior Publication Data
US 2018/0299662 A1 Oct. 18, 2018

(51) Int. Cl.
G02B 5/30 (2006.01)
G02B 27/28 (2006.01)
(Continued)

(52) U.S. Cl.
CPC ......... *G02B 26/008* (2013.01); *G02B 5/3083* (2013.01); *G02B 27/283* (2013.01);
(Continued)

(58) Field of Classification Search
CPC .. H04N 9/3111; H04N 9/3158; H04N 9/3161; H04N 9/3167; H04N 13/363; H04N 9/315; H04N 9/3114; H04N 9/3129; H04N 13/324; H04N 13/332; H04N 13/341; G02B 5/3083; G02B 26/008; G02B 27/283; G02B 27/286; G02B 5/18; G02B 27/26; G02B 27/28; G02B 27/102; G02B 27/143;
(Continued)

(56) References Cited

U.S. PATENT DOCUMENTS 5,486,949 A * 1/1996 Schrenk .................... B32B 7/02
359/489.12
5,921,650 A 7/1999 Doany et al.
(Continued)

FOREIGN PATENT DOCUMENTS

| CN | 102722034 A | 10/2012 |
| CN | 102722074 A * | 10/2012 |
| CN | 102722074 A | 10/2012 |
| WO | 2015/068562 A1 | 5/2015 |

OTHER PUBLICATIONS

International Search Report (ISR) dated Jan. 14, 2016, for PCT/EP2015/061214.
(Continued)

*Primary Examiner* — Mustak Choudhury
(74) *Attorney, Agent, or Firm* — Bacon & Thomas, PLLC (57) ABSTRACT A light conversion system and method for use with at least one light source providing at least one beam of polarized light. The system includes a support structure being rotatable around one of its axes, the support structure having a reflective surface which is fully or partly covered with at least one type of light conversion layer, which is in turn covered with at least one segment of a reflective polarizing sheet.

14 Claims, 5 Drawing Sheets (51) Int. Cl.
*G02B 26/00* (2006.01)
*G03B 21/20* (2006.01)
*H04N 9/31* (2006.01)
*G03B 33/08* (2006.01)
*H04N 13/363* (2018.01)

(52) U.S. Cl.
CPC ......... *G02B 27/286* (2013.01); *G03B 21/204* (2013.01); *G03B 21/2073* (2013.01); *G03B 33/08* (2013.01); *H04N 9/3111* (2013.01); *H04N 9/3161* (2013.01); *H04N 9/3167* (2013.01); *H04N 13/363* (2018.05); *H04N 9/3158* (2013.01)

(58) Field of Classification Search
CPC .. G03B 21/2073; G03B 21/204; G03B 33/08; G03B 21/20; G03B 21/2033; G03B 21/142; G03B 21/208; G03B 21/2066; G03B 33/06; G03B 33/0857; H01S 5/141; H01S 5/423
USPC .... 359/485.01, 485.03, 489.12, 489.19, 576, 359/599, 900; 264/1.31, 1.34, 1.7; 362/84, 231, 235, 293, 554, 607
See application file for complete search history.

(56) References Cited

U.S. PATENT DOCUMENTS

| | | |
|---|---|---|
| 7,547,114 B2 | 6/2009 | Li et al. |
| 2005/0041163 A1 | 2/2005 | Butler-Smith et al. |
| 2009/0034284 A1* | 2/2009 | Li ................. G03B 21/204 |
| | | 362/554 |
| 2011/0032483 A1 | 2/2011 | Hruska et al. |
| 2011/0199580 A1 | 8/2011 | Hirata et al. |
| 2012/0075589 A1 | 3/2012 | Li |
| 2014/0240676 A1 | 8/2014 | Maes et al. |

OTHER PUBLICATIONS

Written Opinion dated Jan. 14, 2016, for PCT/EP2015/061214.
Second Written Opinion dated Apr. 13, 2017, for PCT/EP2015/061214.
International Preliminary Report on Patentability (IPRP) dated Sep. 6, 2017, for PCT/EP2015/061214.
Zhu et al., "Transflective Liquid Crystal Displays", Journal of Display Technology, IEEE Service Center, New York NY, US, vol. 1, No. 1, pp. 15-29, Sep. 1, 2005.

* cited by examiner

POLARIZED WAVELENGTH CONVERSION WHEEL

The present invention relates to the field of illumination and in particular to systems and methods that comprise wavelength conversion such as projectors including video projectors.

BACKGROUND OF THE INVENTION

In recent years solid state light sources have made their entry as light sources for e.g. video projectors. Some important drivers to replace short arc lamps with solid state alternatives are a long lifetime, avoiding hazardous substances such as mercury, which can be found in some arc lamps, a better reliability and a wider color gamut.

For high brightness levels, e.g. over 2000 lm, the étendue of conventional RGB LED light sources can be too large in order to efficiently couple to small light valves. For high brightness projectors it is therefore common to use RGB (RGB color space) lasers, due to their small étendue which are better suited for small light valves. However lasers can be an expensive solution, in particular green lasers can be expensive and also show lower efficiency. One way of reducing costs of a laser based solution can be to use cheaper types of light sources together with a wavelength conversion technology that can, for example, be based on phosphor or quantum dot luminophores.

With a chosen technology, the short wavelength excitation light, for example blue or near-UV laser light, can be converted into light with longer wavelength, for example green, yellow or red light. An RGB light source may be created, e.g. by utilizing a red laser diode array and a blue laser diode array, together with e.g. a phosphor material. A phosphor material can emit a longer wavelength than it is illuminated with, e.g. it can be illuminated with blue light and emit green or red light. In this way red, green and blue can be obtained with just a red and a blue light source. To facilitate operation, the phosphor can be put on a wheel that can rotate. Such a wheel is hereafter referred to as a wavelength conversion wheel. For single chip projectors, a wheel with different segments of different types of phosphor yielding different colors, can use the light from a blue laser source to sequentially generate all primary colors, such as red, blue and green. Such a wheel having segments of different materials converting the initial light into different colors, is hereafter referred to as a multicolor wavelength conversion wheel.

In order to function with the highest possible effectiveness as a light source, the étendue of the light source should be made smaller than the étendue of the projector. In this way substantially all energy of the light beam will enter the projector. In order to meet this requirement and reduce the étendue, the excitation light source may be limited to illuminating a smaller area (spot size) of the phosphor. However, the smaller the illuminated spot size, the higher the energy density in the corresponding area, and the more difficult it may become to cool the phosphor and maintain the highest conversion efficiency on the phosphor.

In addition to effects related to the étendue, light emitted from a phosphor is not polarized and, thus, phosphor conversion technology cannot be used efficiently in applications requiring polarized light. Such applications can for example be liquid crystal based projectors (e.g. liquid crystal on silicon, or transmissive liquid crystal display technology) and polarized stereoscopic projection.

Solutions to polarize the light from a phosphor source have been proposed in the pending US application US20140240676A1. A wiregrid reflective polarizer is used to reflect the converted light with the unwanted polarization direction back to the phosphor. The power density on the wiregrid reflective polarizer can be high, as the polarizer is in close proximity to the phosphor and subjected to both the incoming excitation light and the converted light. A heat sink for the wire grid can be provided if it is optically bonded to the phosphor layer and the support structure. However, bonding the wire-grid polarizer at the wire-grid side is ruled out since embedding the wire-grid in a medium with a different refractive index would inhibit the wiregrid from proper functioning. Bonding the wire-grid polarizer at the opposite side of the substrate would increase the thermal resistance and the spacing between the wire-grid and the phosphor layer. The increased spacing would lead to widening of light spot size, after one or more reflections, which results in an increase of the étendue of the converted light source.

Polarization recycling is a principle often used for LCD backlights. A reflective polarizer is positioned in between the liquid crystal display and a highly reflective backlight cavity. A special reflective polarizer foil has been described in U.S. Pat. No. 5,486,949 A, using birefringent interference layers, and is commercialized under the name Vikuiti™ Dual Brightness Enhancement Film (DBEF). This type of reflective polarizer has almost no light absorption, and can be cost effectively produced through e.g. by a co-extrusion process, as a thin polymeric foil. A general description of such a foil (or film or sheet) can be a Multilayer Birefringent Interference Polarizer, hereafter referred to as MBIP.

U.S. Pat. No. 7,547,114 B2 discloses a moving plate with wavelength conversion material where a reflective polarizer may be put adjacent to the wavelength conversion material, in combination with an LED or laser light source. However, all the light from the light source with a polarization perpendicular to the transmitting direction of the reflective polarizer will be blocked, hence, it would lead to a severe reduction in energy content. The use of a moving plate complicates cooling and makes fast transitions between color segments (e.g. for color sequential single chip projectors) very hard to achieve.

SUMMARY OF THE INVENTION

It is an objective of the present invention to provide a good light conversion system and/or a good method for converting a polarized light beam into light with a different such as a longer wavelength. Embodiments of the present invention may overcome or reduce one or more of the above mentioned deficiencies. Embodiments of the present invention can enable efficient polarization of light emitted from a phosphor wheel. For example embodiments of the present invention may reduce the étendue of the phosphor light source to 50%. The area of the phosphor that can be coupled to the projector étendue is doubled. This implies that with embodiments of the present invention, the same power density of the excitation light, the projector light output can be almost doubled.

In one aspect the present invention provides a light conversion system for use with at least one light source providing at least one beam of polarized light. The system comprises a support structure being rotatable around one of its axes, said support structure having a reflective surface which is fully or partly covered with at least one type of light conversion layer, which is in turn covered with at least one segment of a reflective polarizing sheet. In operation when the at least one light beam is impinging onto the support structure in a certain position, and for each position that has a reflective polarizing sheet, said sheet is oriented so that it transmits in the polarization direction of the impinging light beam. By aligning transmission and polarization direction polarized light is provided with the help of a "color wheel solution". Further output can be increased without increasing étendue.

A multiple of reflective polarizing sheets can be segments of a circle that each covers an angle of maximum 15 degrees. This can provide an optimal size of segments of a "Multilayer Birefringent Interference Polarizer", or "MBIP" which is a size of segments to reduce misalignment to the polarization of incoming beam.

The segments may comprise one, two or more types of wavelength conversion materials. The different materials can be used produce one, two or more colors. Such colors can sequentially produce different colors for single chip projection, for example.

The reflecting polarizing sheet can be connected to the support structure with at least one medium having a thermal conductivity larger than that of air, for example optically transparent silicone or epoxy. This has an advantage in providing heat transport to a heat sink. This increase preserve or help to preserve the color conversion layer. This can be achieved by a good thermal contact with a heat sink to avoid or reduce heat build-up and quenching of the color conversion layer.

At least one part of the rotatable support structure can have no wavelength conversion layer. Where there is no wavelength conversion layer, unconverted light is provided, e.g. to obtain also the color of the unconverted light for single chip projection.

Consecutive segments of reflective polarizing sheets, which are covering the same type of wavelength conversion material, can alternate between having a transmission direction being aligned with the polarization direction of the impinging light beam or being orthogonal to the polarization direction of the impinging light beam. This allows polarization switching for multichip operation, e.g. to be able to make 3D imaging for multichip operation.

A wavelength selective retarder can be provided that rotates the initial polarization of an impinging light beam through 90 degrees. For example, rotating incoming blue light will result in it not being reflected non-converted.

Consecutive segments of reflective polarizing sheets, which are covering different types of wavelength conversion material, for each consecutive wavelength conversion material type, can alternate between having a transmission direction being aligned with the polarization direction of the impinging light beam or being orthogonal to the polarization direction of the impinging light beam. This can allow polarization switching for single chip operation. This provides the advantage of being able to make 3D projection with a single-chip, which is of practical importance.

The segments of the different wavelength conversion materials can be arranged in groups having the same order, starting with material n and then followed by material n+1. This can provide a good or even optimal arrangement of the phosphors. This arrangement is more efficient than to have the segments in an arbitrary order.

The reflective surface of the support structure can extend along a direction perpendicular to the rotation axis of the support structure. This allows a placement of the optical materials in a conventional way and hence can make use of a conventional color wheel design.

Alternatively, the reflective surface of the support structure can extend along a direction that is parallel to the rotation axis of the support structure. This allows placement of the optical materials, at the rim of the wheel. In this way the transmitting direction of the reflective polarizer can be fully aligned with the incoming polarization direction at all times.

The surface for light conversion can comprise a phosphor or quantum dot luminophores. This provides an alternative selection of materials allowing the selection of materials most suitable for the application.

The reflective polarizing sheet can be a film or an adhesive film. This provides alternative types of material suitable as a "Multilayer Birefringent Interference Polarizer", or "MBIP".

The at least two light beams can impinge on two separated locations on the rotatable support structure. This allows a decrease in heat load as the light beams do not all fall on one spot so that the energy of two light beams will be distributed. For example, the at least two light beams can impinge on two separated locations on the rotatable support structure at least one beam spot apart. Beams can have different tracks on the color wheel and this feature makes sure that there is no overlap of the beam tracks at any point in time.

The present invention also provides a method for converting a polarized light beam into light with longer wavelength, comprising a beam of polarized light and a support structure with a color conversion material covered with a reflective polarizing sheet, comprising the steps of Having the support structure to rotate Letting the light beam impinge onto a spot on the reflective polarizing sheet, and Orienting the reflective polarizing sheet and the light beam towards each other so that the transmission direction of the reflective polarizing sheet aligns with the polarization direction of the impinging light beam.

This allows alignment of transmission and polarization directions.

Multiple reflective polarizing sheets can be provided as segments of a circle that each covers an angle of maximum 15 degrees, the angle between the transmission direction of the said sheets and the polarization direction of the incoming light coinciding in the centre of the segment, so while rotating the support structure, the angle between the above mentioned directions deviates at most 7.5 degrees. This allows a good or even optimal size of segments of a "Multilayer Birefringent Interference Polarizer", or "MBIP".

The support structure can be allowed to rotate around an axis that is perpendicular to the transmitting direction of the reflective polarizing layer. This allows placement of the optical material in a conventional way.

The support structure can rotate around an axis that is parallel to the transmitting direction of the reflective polarizing layer. This allows a placement of the optical materials at the rim of the wheel.

A support structure can be provided with different types of wavelength conversion materials next to each other, so when the support structure is rotated the impinging light is consecutively converted into different wavelengths. This can produce different colors with a single chip.

Two light beams of the same polarization can be arranged to impinge on the same type of wavelength conversion material at two different places on the support structure. This allows a change of the polarization of one of the converted beams and the combination of the two beams with different polarizations into one beam with maintained étendue of one unpolarized converted beam. This can provided increased output for a multi-chip operation, with the same polarizations. This is a practical arrangement.

Two light beams of different polarization can be arranged to impinge on the same type of wavelength conversion material at two different places on the support structure. The two beams with different polarizations can be combined into one beam with maintained étendue of one unpolarized converted beam. This can result in increased output for a multi-chip operation with different polarizations. Different polarizations of incoming beams can make the system more compact.

Two light beams can be arranged to impinge on the same type of wavelength conversion material at two different places on the support structure, being at least one beam spot apart. The polarization of one of the converted beams can be changed and then the two converted beams with different polarizations can be combined into one beam. This can result in increased output for a multi-chip operation with different polarizations. With different polarizations of incoming beams, the system can be made compact.

At least one reflective layer can be provided that reflects the impinging light beam without altering its wavelength. No color conversion is required and the impinging light can be used as is.

With one type of wavelength conversion layer and one impinging light beam, the polarization directions of the light beams can be made consecutively orthogonal. This allows polarization switching of a multichip projector. If light sources have same initial polarization, one needs to be turned to obtain the 3D effect.

Two types of wavelength conversion layers covering different segments of the support structure can be provided, and one impinging light beam, whereby for each consecutive segment of the same wavelength conversion type, the polarization direction of the light beams is made consecutively orthogonal. This allows polarization switching of single chip projector. This allows 3D operation with a phosphor color wheel.

BRIEF DESCRIPTION OF DRAWINGS

FIGS. 1a), 1b) and 1c) show embodiments of the present invention where a wavelength conversion wheel can be adapted to deliver polarized light.

FIGS. 3a) and 3b) show embodiments of the present invention comprising a system for wavelength conversion for a single chip projector with increased brightness.

FIGS. 4a) and 4b) show embodiments of the present invention comprising a system for wavelength conversion and polarization switching for a single chip projector.

FIG. 6a) and b) show embodiments of the present invention comprising two light beams following two non-overlapping tracks.

DETAILED DESCRIPTION OF THE INVENTION

The invention will now be described with respect to certain embodiments and with respect to certain drawings. The drawings are schematic and are not limiting. The appended claims define the present invention. Each dependent claim can describe a further embodiment.

Figure 1:
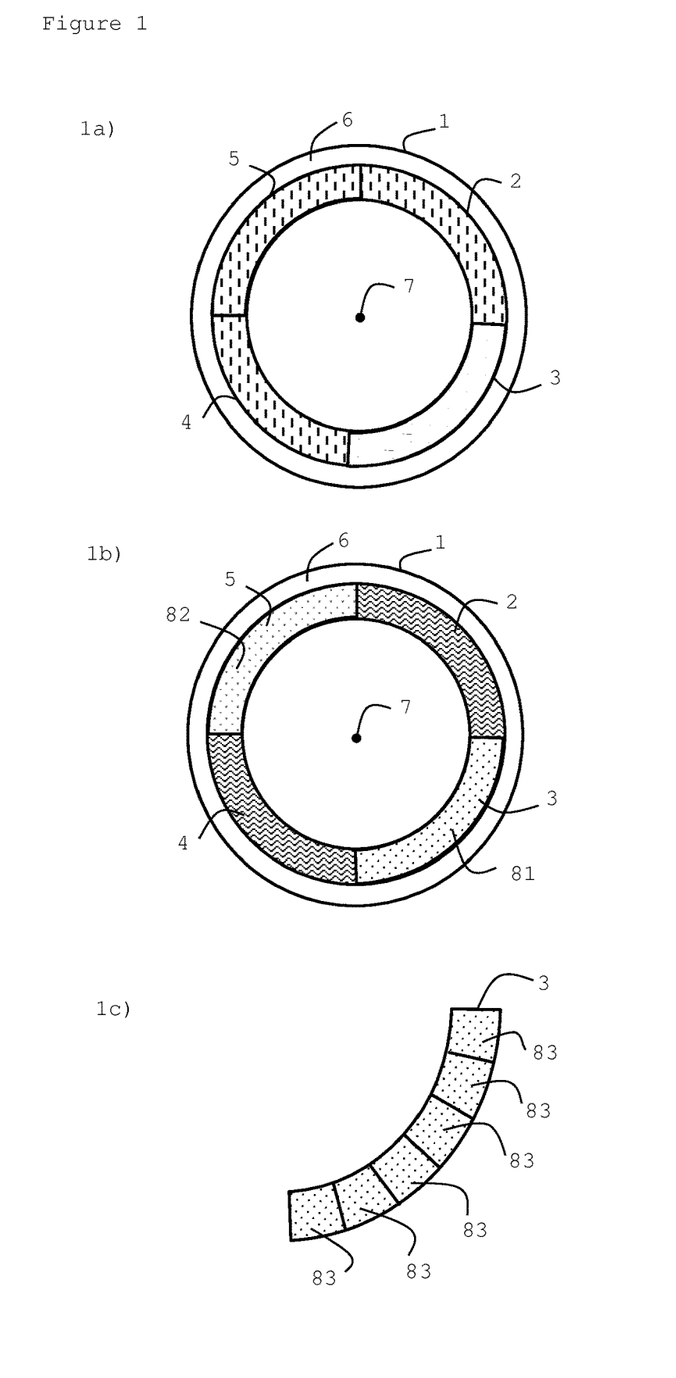

FIG. 1a) shows an embodiment of the present invention. A wavelength conversion wheel 1 can be used to convert an incoming excitation light of an initial wavelength (that is also polarized light) into light with a wavelength different from, e.g. longer than that of the initial one, and with a certain polarization. The rotatable wavelength conversion wheel 1 is fully or partly covered with a wavelength conversion layer 6. This wavelength conversion layer 6 can for example be based on a phosphor. The conversion layer 6 can be e.g. arranged so that its area matches segments 2,3,4, and 5, in a ring shape having an outer and inner radius. The conversion layer 6 is here extending in a plane perpendicular to the rotation axis 7. A multiple of segments 2, 3, 4 and 5, of a reflective polarizing sheet, are placed on top of the color conversion layer 6. These segments can be in the form of, for example, a foil, such as e.g. Vikuiti™ DBEF-Q from 3M, St. Paul Minn. USA. A general description of such a foil (or film or sheet) can be a Multilayer Birefringent Interference Polarizer, hereafter referred to as MBIP. An MBIP film comprises a polarizing layer and has a transmission direction. The segments 2 to 4 are each oriented so that their transmission direction is substantially parallel with the incoming excitation light; the accuracy increases with the number of segments. FIG. 1c) illustrates how segment 3 can be further divided into 6 sub-segments 83. If each segment is slightly rotated in comparison with its neighbour, it is possible to keep the transmission direction substantially constant as the wheel rotates and the incoming beam is not moving. In this way the rotatable wavelength conversion wheel 1 will, provide a high intensity polarized light beam of a well-defined wavelength range throughout its rotation.

FIG. 1b) shows another embodiment of the present invention that can provide a system for polarization switching, which can be used for 3D projection, for example. The wavelength conversion wheel 1 comprises a wavelength conversion layer 6 that is covered with segments of a MBIP film 2, 3, 4 and 5. Film segment 2 and 4 are oriented with their transmission direction aligned with e.g. a first polarization direction. Film segments 3 and 5 are oriented with their transmission direction aligned with e.g. a second polarization direction. Preferably, the intention is to match the polarization direction of the incoming light with the transmission direction of the MBIP film. Assume the initial incoming light has a polarization direction parallel with the transmission direction of film segments 2 and 4. In order to match the transmission direction of film segments 3 and 5, the light must be rotated. This can be done with color selective half wave retarders 81 and 82 that can be placed on top of the MBIP segments 3 and 5. These retarders rotate the polarization of the incoming light while leaving the polarization of the converted light unaffected. In case the incoming light would be used in its unconverted form, the polarization switching can be achieved with a reflective wheel without a color conversion layer and segments 3 and 5 being covered with a quarter wave retarder.

In another embodiment the orientation of the MBIP layer can be arranged to always transmit the polarization of the incoming excitation light. A different type color selective half wave retarder can then be placed on segments 3 and 5 to rotate the converted light while leaving the polarization of the incoming light unaffected.

A polarization maintaining diffuser can also be attached to all reflective segments of any embodiment of the present invention to provide diffusion and/or de-speckling. Wavelength converted light, e.g. by means of phosphor, can have a wide emission angle (+/−90°) and the excitation light, e.g. blue laser light, will typically have a smaller angle. To obtain good color uniformity, all three colors should have the same emission angle. A diffuser can expand the angles of the excitation light to be in the same range as the converted light. Additionally, the diffuser can also break the coherence of the light in order to reduce speckle effects. Alternatively to a polarization maintaining diffuser on the reflective segments, in accordance with any of the embodiments of the present invention also a diffuse reflector (e.g. white paint) can be used with an MBIP film on top. Similar to the segments covered with a color conversion layer, the reflected light will be polarized after multiple reflections.

FIG. 1c) shows another embodiment of the present invention. The reflecting polarizing layer of segment 3 in FIG. 1b) has been further subdivided into 6 segments 83 that each covers an angle of about 15 degrees. This will make a larger part of incoming light to be aligned with the transmission direction of the reflecting polarizing layer. For 15 degrees coverage, the orientation would deviate at most +/−7.5° from the ideal orientation. The transmission of the desired polarization direction would then vary between 100% (in the centre of the sector) and 99% (sin 82.5°) at the start and end of the sector. The same sub-division would be made, mutatis mutandis, on the other segments of reflecting polarizing layers in the embodiment.

This level of quality is preferably achieved in any of the embodiments of the present invention.

Figure 2:
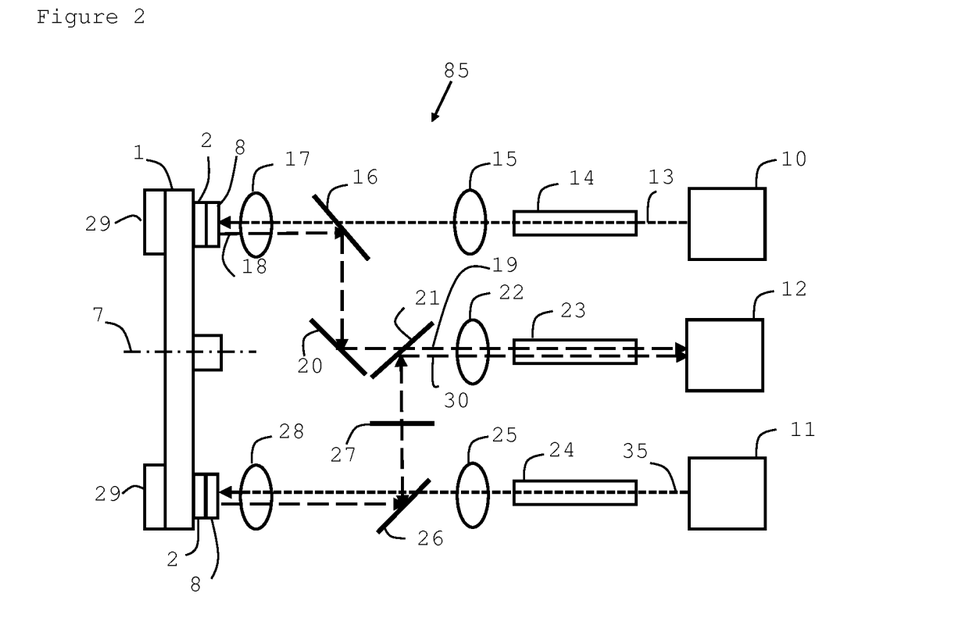
FIG. 2 shows an embodiment of the present invention comprising a system for wavelength conversion with increased brightness.

FIG. 2 shows another embodiment of the present invention. The wavelength conversion wheel 1 is here incorporated in a system 85 which further comprises two light sources 10 and 11. This system can provide monochrome multi-chip 2D projection. The light sources 10 and 11 provide polarized light with short wavelength, for example with the color blue. The wavelength conversion wheel 1 can rotate around its axis 7 and also has a wavelength conversion layer 2 and a reflecting polarizing layer 8. In the following figures shorter and longer wavelength of the light beams are indicated with shorter and longer dashes respectively.

The system further comprises a projector 12 where the final light beams can be collected for image formation. A laser light such as a blue laser light 13 can leave the light source 10 and enter a light pipe integrator 14. Note that each lens illustrated in the following figures are schematic and may comprise a lens system, but still be referred to as a "lens". Since the function of each lens can be implemented with various lens system configurations, a general statement is hereby made that is valid for all lenses in the following text. The purposes of the lenses in the following text comprise to make sure that 1) the unconverted light, exiting the integrator (e.g. an integrator rod) is imaged onto the wavelength conversion wheel with a certain demagnification factor, and
2) the converted light sent to the integrator (e.g. an integrator rod) before entering the projector, has a size as close as possible to that of the integrator entrance area.

Hence, the lenses will have different functions in different directions.

For example, lens 15 can bring the light beam substantially parallel before it impinges onto the dichroic mirror 16. The light beam can then pass lens 17, which will converge the beam (which can here be an image from the exit of integrator rod 14 with a certain demagnification factor) and create a focused image on the wavelength conversion wheel 1 with the reflecting polarizer 8 and the light conversion material 2. The layers 8 and 2 can be mounted onto the wavelength conversion wheel 1, so that 1 provides a heat sink for the layers 8 and 2. Additional bulk material 29 can be mounted onto the wavelength conversion wheel 1, e.g. on the backside, in order to increase the heat sink.

The light is now reflected and polarized by layers 2 and 8 of the wavelength conversion wheel, and heads back via the lens 17 onto the dichroic mirror 16 and further onto the mirror 20 which can redirect the light to the PBS 21. The PBS 21 filters out any residual unwanted polarization direction, but will pass on the majority of the light which then can then enter the lens 22. The Lens 22 converges the light onto the light pipe integrator 23 and the light then finally enters the projector 12.

The light 35 from the light source 11 can enter the light integrator and then passes the lens 25, which makes the light beam substantially parallel, and the dichroic mirror 26. The light continues through the lens 28, which will converge the beam (which can here be an image from the exit of integrator rod 24 with a certain demagnification factor) and create a focused image on the wavelength conversion wheel 1 with the reflecting polarizer 8 and the light conversion material 2. The light is now reflected and polarized by layers 2 and 8 of the wavelength conversion wheel, and heads back via the lens 28 onto the dichroic mirror 26. The light then passes broadband half wave retarder 27 that rotates the polarization direction such that it becomes perpendicular to that of beam 19. The light is then reflected by the PBS 21. The two light beams 19 and 30 now have different polarization directions but the étendue is still limited to the size of one spot. The two beams enter the integrating rod 23 and finally enter the projector 12.

FIGS. 3a) and 3b) shows another embodiment of the present invention. The system 86 provides a solution for a multicolor sequential single-chip system. The multicolor wavelength conversion wheel will comprise several segments of color conversion layers, next to each other, similar to FIG. 1b). In addition the wheel will also comprise a reflective segment (with optional diffuser) to reflect the incoming un-converted light. Such a system can provide all the desired color sequences to create for example a RGB or RYBG color space. The broadband half wave retarder 27 of FIG. 2 is in FIGS. 3a) and 3b) replaced with a color selective half wave retarder 31. The color selective retarder 31 rotates the converted light beams by 90 degrees, and exerts no action on the unconverted light. An additional color selective retarder 32 will rotate the unconverted light, by 90 degrees, and exerts no action on the converted light of that source.

FIG. 3a) is a snapshot of the case when the incoming excitation light beams each hit a place on the wavelength conversion wheel that has color conversion layer 2 and the MBIP layer 8. The polarization of the converted light is rotated by color selective retarder 31 and unaffected by the color selective retarder 32.

FIG. 3b) is a snapshot of the case when the incoming excitation light beams each hit a place on the wavelength conversion wheel that has no color conversion layer but a reflecting layer 90 and a quarter wave retarder 87. The double pass through the quarter wave retarder rotates the polarization of the unconverted light. Because of the change in polarization, the dichroic PBS 91 and 34 are reflecting the unconverted light (otherwise it would return to the source) onto the color selective retarders 31 and 32. Color selective retarder 32 will rotate the unconverted light with 90 degrees, while color selective retarder 31 exerts no action on the unconverted light. The light beams are eventually collected by means of PBS 21 and collimating lens 22 to enter the integrating rod 23 and the projector 12.

Figure 4:
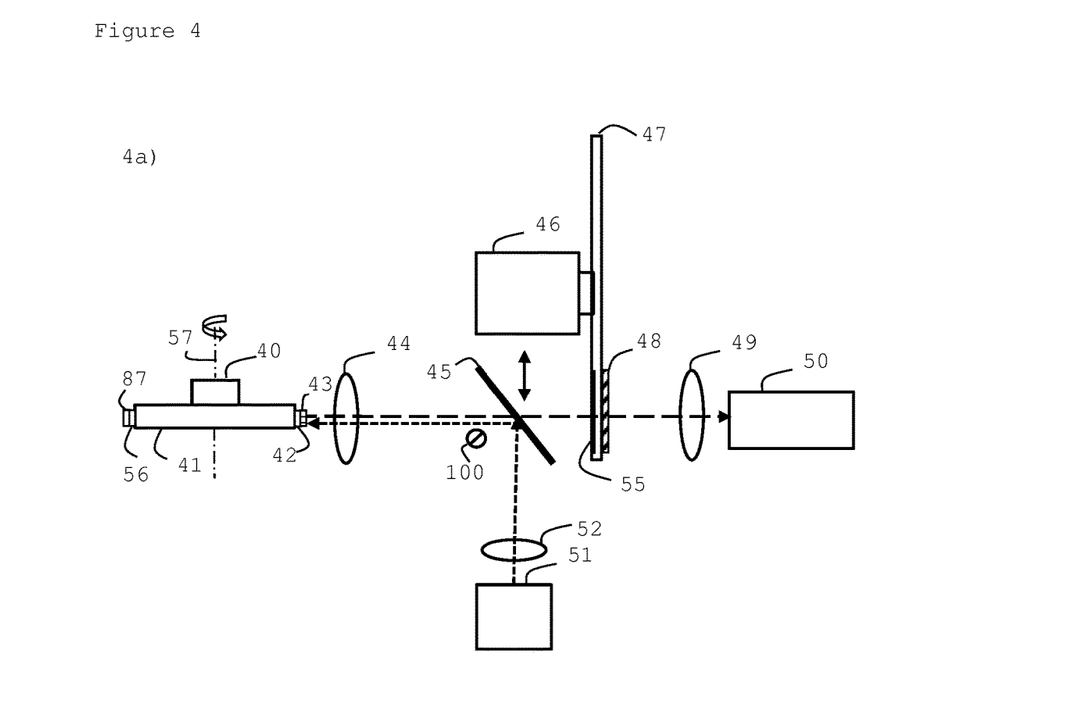

FIGS. 4*a*) and 4*b*) show another embodiment of the present invention for a single chip projector for 3D projection using polarization switching. For the unconverted excitation light (in the reflective segments) it is not possible to implement the polarization switching on the multicolor wavelength conversion wheel itself (as one of the polarizations would return in the direction of the laser source). A clean-up color filter wheel 47 that filters (at least) unconverted blue light during the green and red segment is preferably implemented together with a multicolor wavelength conversion wheel. Thus the polarization switching can be integrated on this clean up filter wheel 47, by means of a half wave retarder 48 in one of the blue segments. Also, it might be beneficial to also implement the polarization switching for the converted colors on the clean-up color filter wheel since the incident angles can be better controlled. In this case there would be no need to apply a color selective retarder onto some of the converted color segments of the multi-color wavelength conversion wheel.

FIG. 4*a*) illustrates an embodiment of the present invention where converted light is filtered by the clean-up filter wheel 47. The light source 51 provides polarized light with short wavelength and polarization 100. The light passes lens 52 and is then reflected by a dichroic PBS 45 onto a lens 44 and further onto the wavelength conversion material 42 and the MBIP layer 43 that are mounted on the rim of the wheel 41, run by a motor 40. The converted light passes lens 44 and the dichroic PBS 45 to impinge on the clean-up wavelength filter wheel 47. The light passes an area on the wheel 47 having a bandpass filter 55 that filters out the wavelength of the unconverted light, and selects the desired wavelengths from the converted light. Then the light passes a half wave retarder 48 before it enters a lens 49 and the projector 50.

FIG. 4*b*) illustrates an embodiment of the present invention for when non-converted light with polarization 101 (perpendicular to that of 100) is passing the clean-up filter wheel 47 where there is no filtering effect. The situation shown in FIG. 4*b*) shows the case where no altering of the transmitted light is done. To obtain a 3D effect, some segments of the wheel 47 will however be covered with a half wave retarder 48 in order to provide the alternative polarization. This situation is not shown in FIG. 4*b*) but correspond to how segments 3 and 5 in FIG. 1*b*) are covered with half wave retarders 81 or 82. The light source 51 provides polarized light with short wavelength. The light passes a lens 52 and is reflected by dichroic PBS 45 onto lens 44 and further onto a reflector 56 and a quarter wave retarder 87 that are mounted on the rim of the wheel 41, run by a motor 40. The reflected light passes lens 44 and the dichroic PBS 45 to impinge on the clean-up wavelength filter wheel 47. The light passes the wheel 47 where no filter material is present and then enters a lens 49 and the projector 50.

Figure 3:
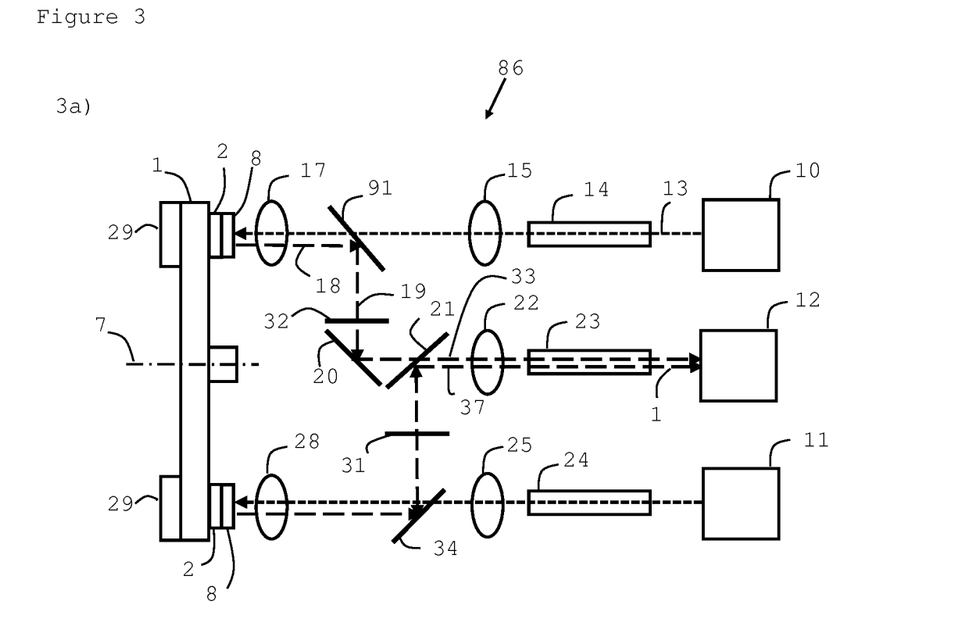

The embodiments of FIGS. 4*a*) and 4*b*) are not limited to the wavelength conversion wheel 41 but can also comprise a wheel like 1 shown in FIG. 2 or 3 a combination which is incorporated as an embodiment of the present invention.

As an alternative to dividing the reflecting polarizing layer into many segments (as in FIG. 1*c*) it is possible to create a wheel with a thicker edge and place the color conversion layer on the edge so it is perpendicular to the light path of the incoming excitation light, a combination which is incorporated as an embodiment of the present invention.

Figure 5:
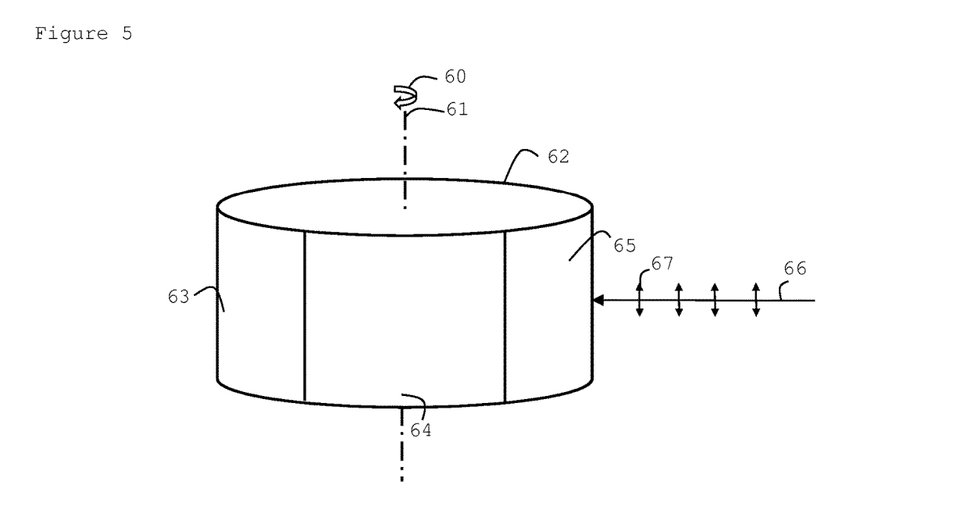
FIG. 5 shows an embodiment of the present invention comprising a multicolor wavelength conversion wheel with the light conversion surface extending along a plane parallel to the rotation axis of the wheel.

FIG. 5 shows an embodiment of the present invention where the wavelength conversion wheel 62 is made thicker so that wavelength conversion layer 64, and reflecting polarizing films, 63 and 65 are deposited at the rim of the wheel and parallel with its rotation axis. The orientation of the wheel is then arranged so that the rim of the wheel faces the incoming radiation 66. The polarization 67 of the incoming radiation can be aligned with the transmission direction of the MBIP layer 65. Alternatively, a color selective retarder is added to some of the segments so that polarization switching can be achieved.

The inventor has found that when the excitation power on the phosphor increases, the converted light output power does not necessarily scale linearly. At very high power densities, optical saturation can occur for certain phosphors. Further, if the temperature of the phosphor increases, thermal quenching starts to occur. At a certain point the effect of thermal quenching can outweigh the effect of increased excitation power such that the effective light output even decreases as the excitation power increases. For both reasons it can therefore be advantageous to split the excitation power over at least two or more individual beams. These beams can be aimed onto different spots such as two different spots on two different phosphor wheels or onto two different spots on the same phosphor wheel. The latter can for example comprise two different spots at opposite sides of the wheel, or following two non-overlapping tracks on the same side of the wheel. All these combinations are incorporated as embodiments of the present invention. It can be beneficial if the phosphor track on the wheel is wide enough, such that the offset from the wheel centre for the two spots is different enough so that both spots cover and heats different areas on the phosphor wheel as it rotates. By polarizing the light from one of the two spots, the light can be combined again using a dichroic polarizing beam splitter, and this while maintaining the étendue of a single spot.

Figure 6:
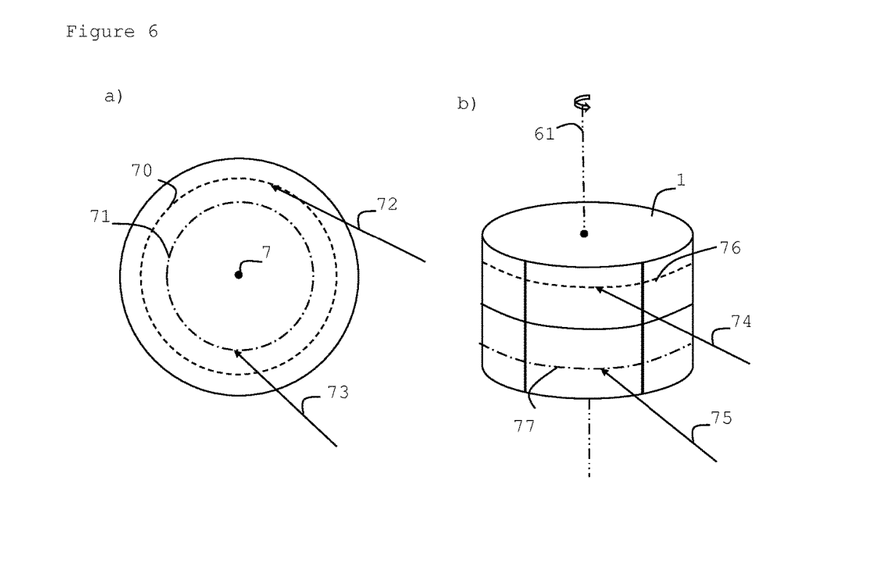

FIGS. 6*a*) and 6*b*) shows an embodiment of the present invention where two light beams are positioned so that they cover two non-overlapping tracks on a wheel 1. In FIG. 6*a*) the wavelength converting material and the reflective polarizing layer is extending in a plane perpendicular to the wheel's rotation axis 7. The light beams 72 and 73 are impinging on the wheel, that rotates, so that 72 and 73 covers the tracks 70 and 71 respectively. FIG. 6*b*) shows the case for when the wavelength converting material and the reflective polarizing layer extends in parallel to the wheels' rotation axis 61. As the wheel rotates, the beams 74 and 75 will cover the tracks 76 and 77 respectively. This spreading out of the light beams decreases the energy intensity per wheel area so that the wavelength conversion material can remain efficient. This principle can also be implemented in the systems of FIGS. 2 and/or 3.

Figure 7:
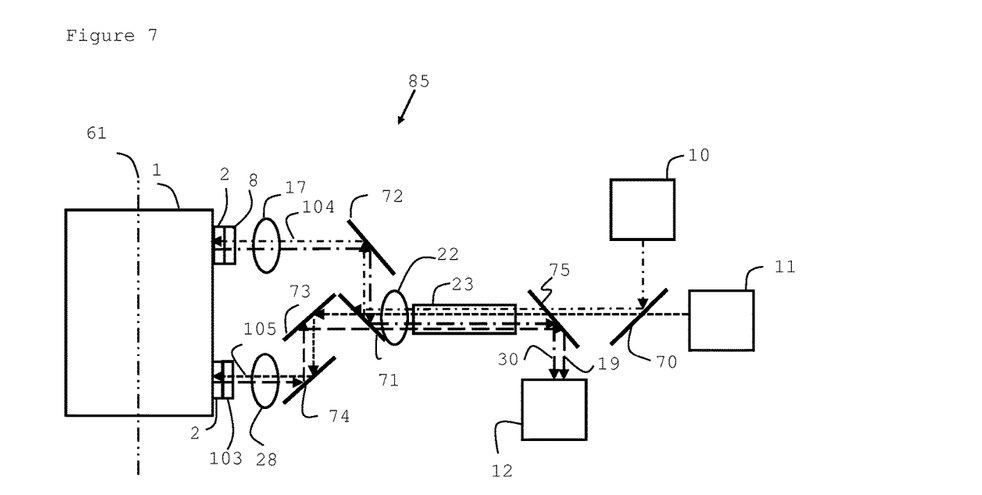
FIG. 7 shows and embodiment of the present invention comprising two light sources providing light with different polarization.

FIG. 7 shows another embodiment of the present invention. This can be seen as an alternative implementation of the setup of FIG. 2 using the wheel 1 of FIG. 6*b*. Laser sources 10 and 11 now have orthogonal polarizations. They are combined with PBS 70 and pass uniformization stage 23, for example an integrating rod, after which they are split again by PBS 71. Mirrors 72, 73 and 74 are regular mirrors to deflect the incoming light such that it hits the wavelength conversion wheel at 2 locations. The orientation of MBIP 8 is different from the orientation of MBIP 103 such that 8 is aligned with the polarization of the incoming light 104 and 103 is aligned with the polarization of the incoming light 105. The converted light beams have the same polarizations as the incoming light beams, respectively, and follows the reverse path. Both beams are combined by PBS 71 and enter the uniformization stage 23 in the opposite direction away from the conversion wheel. Dichroic mirror 72 couples the converted light beams into one light beam with to so that the projector 12. The advantages comprise a reduced amount of components and more compact setup. For example, the solution does not need any retarders. This set-up can also be implemented, mutatis mutandis, with the wheel type of FIG. 6*a*) a combination which is incorporated as an embodiment of the present invention.

The invention claimed is:

1. A wavelength conversion system comprising at least one light source providing at least one beam of polarized light, and a wavelength conversion wheel being rotatable around one of its axes, said wavelength conversion wheel having a reflective surface which is fully or partly covered with at least one type of wavelength conversion layer, which is in turn covered with at least one segment of a reflective polarizing sheet, the at least one light beam is impinging on the reflective polarizing sheet, passes through the wavelength conversion layer, if present, and is reflected from the reflective surface of the wavelength conversion wheel being in a certain position, and for each position of the reflective polarizing sheet, said reflective polarizing sheet is oriented so that it transmits in the polarization direction of the impinging light beam, wherein the reflective polarizing sheet is a Multilayer Birefringent Interference Polarizer connected to the wavelength conversion wheel by at least one medium having a thermal conductivity larger than that of air, wherein the at least one segment of the reflective polarizing sheet comprises segments of an area of a circle that each covers an angle of maximum 15 degrees.

2. The wavelength conversion system according to claim 1, wherein the segments comprise one or two types of wavelength conversion materials.

3. The wavelength conversion system according to claim 1, wherein the reflective polarizing sheet is connected to the wavelength conversion wheel with optically transparent silicone or epoxy.

4. The wavelength conversion system according to claim 1, wherein at least one part of the rotatable wavelength conversion wheel has no wavelength conversion layer.

5. The wavelength conversion system according to claim 1, further comprising consecutive segments of reflective polarizing sheets, wherein the consecutive segments of reflective polarizing sheets, which are covering a same type of wavelength conversion material, alternates between having a transmission direction being aligned with the polarization direction of the impinging light beam or being orthogonal to the polarization direction of the impinging light beam.

6. The wavelength conversion system according to claim 1, combined with a wavelength selective retarder that rotates the initial polarization of an impinging light beam with 90 degrees.

7. The wavelength conversion system according to claim 1 further comprising consecutive segments of reflective polarizing sheets, wherein the consecutive segments of reflective polarizing sheets, which are covering different types of wavelength conversion material, for each consecutive wavelength conversion material type, alternates between having a transmission direction being aligned with the polarization direction of the impinging light beam or being orthogonal to the polarization direction of the impinging light beam.

8. The wavelength conversion system according to claim 1, wherein the reflective surface of the wavelength conversion wheel extends along a direction perpendicular to the rotation axis of the support structure wavelength conversion wheel or parallel to the rotation axis of the support structure wavelength conversion wheel.

9. The wavelength conversion system according to claim 1, wherein at least two light beams impinge on two separated locations on the rotatable wavelength conversion wheel at least one beam spot apart.

10. A method for wavelength converting a polarized light beam into light with longer wavelength, comprising a beam of polarized light and a wavelength conversion wheel with a color conversion material covered with a reflective polarizing sheet, the reflective polarizing sheet being a Multilayer Birefringent Interference Polarizer and is connected to the wavelength conversion wheel by at least one medium having a thermal conductivity larger than that of air, comprising the steps of: rotating the wavelength conversion wheel, letting the light beam impinge onto a spot on the reflective polarizing sheet, and orienting the reflective polarizing sheet and the light beam towards each other so that a transmission direction of the reflective polarizing sheet aligns with the polarization direction of the impinging light beam, wherein a multiple of reflective polarizing sheets are segments of an area of a circle that each covers an angle of maximum 15 degrees.

11. The method for wavelength converting according to claim 10, wherein the angle between the transmission direction of the said sheets and the polarization direction of the incoming light are coinciding in the centre of the segment, so while rotating the wavelength conversion wheel, the angle between the above mentioned directions deviates at most 7.5 degrees.

12. The method according to claim 10, wherein the wavelength conversion wheel rotates around an axis that is perpendicular to the transmitting direction of the reflective polarizing layer or parallel to the transmitting direction of the reflective polarizing layer.

13. The method according to claim 10 comprising the steps of having two light beams of the same polarization impinge on the same type of wavelength conversion material at two different places on the wavelength conversion wheel, change the polarization of one of the converted beams and combine the two beams with different polarizations into one beam with maintained étendue of one unpolarized converted beam.

14. The method according to claim 10 comprising the steps of having two light beams of different polarization impinge on the same type of wavelength conversion material at two different places on the wavelength conversion wheel, and combine the two beams with different polarizations into one beam with maintained étendue of one unpolarized converted beam.

* * * * *